(12) United States Patent
Perkins et al.

(10) Patent No.: US 6,758,423 B1
(45) Date of Patent: Jul. 6, 2004

(54) SPRAY GUN WITH DATA DEVICE AND METHOD OF CONTROL

(75) Inventors: Jeffrey A. Perkins, Amherst, OH (US); Charles L. Gatian, III, North Ridgeville, OH (US); Thomas Trautzsch, North Royalton, OH (US); James D. Powell, deceased, late of Amherst, OH (US); Kenneth Zalewski, Euclid, OH (US); Andrew M. Peddie, North Royalton, OH (US); Joseph G. Schroeder, North Royalton, OH (US)

(73) Assignee: Nordson Corporation, Westlake, OH (US)

( * ) Notice: Subject to any disclaimer, the term of this patent is extended or adjusted under 35 U.S.C. 154(b) by 111 days.

(21) Appl. No.: 09/612,847

(22) Filed: Jul. 10, 2000

(Under 37 CFR 1.47)

Related U.S. Application Data

(60) Provisional application No. 60/154,560, filed on Sep. 17, 1999.

(51) Int. Cl.⁷ ................................................. B05B 5/00
(52) U.S. Cl. ........................... 239/690; 239/67; 239/69; 239/71; 239/703; 239/708; 239/695
(58) Field of Search .............................. 239/690, 690.1, 239/692, 694, 695, 698, 703, 708, 67, 69, 71

(56) References Cited

U.S. PATENT DOCUMENTS

| | | | |
|---|---|---|---|
| 4,023,020 A | | 5/1977 | Lestradet |
| 4,216,915 A | * | 8/1980 | Hengartner et al. ........ 239/698 |
| 4,467,961 A | | 8/1984 | Coffee et al. |
| 4,660,771 A | * | 4/1987 | Chabert et al. ............... 239/69 |
| 4,723,726 A | * | 2/1988 | Ooishi et al. ............... 239/703 |
| 5,060,860 A | * | 10/1991 | Megerle ...................... 239/67 |
| 5,503,880 A | * | 4/1996 | Matschke ................... 239/690 |
| 5,718,767 A | | 2/1998 | Crum et al. |
| 5,725,161 A | | 3/1998 | Hartle |
| 5,725,670 A | | 3/1998 | Wilson et al. |
| 5,741,558 A | * | 4/1998 | Otani et al. ................. 118/308 |
| 5,743,958 A | | 4/1998 | Shutic |

(List continued on next page.)

FOREIGN PATENT DOCUMENTS

| | | |
|---|---|---|
| EP | 0891865 A2 | 7/1998 |
| EP | 0 753 923 B1 | 4/2002 |

OTHER PUBLICATIONS

Patent Abstracts of Japan, vol. 1997, No. 06, Jun. 30, 1997 and JP 09 048120 A, Feb. 18, 1997.

"Powder Spray Systems." Nordson Corporation, 16 pages.

"Electostatic Phenomena in Powder Coating—New methods of improving Faraday–cage coating, finish quality and uniformity, and recoating operations." Sergey Guskov—Nordson Corporation, 12 pages.

*Primary Examiner*—Robin O. Evans
(74) *Attorney, Agent, or Firm*—Calfee, Halter & Griswold, LLP

(57) ABSTRACT

A system and method of storing and reading parameter data associated with an electrostatic spray gun power supply is provided. The method includes, for example, the steps of reading parameter data associated with a power supply for a particular spray gun from a database and storing the parameter data in a memory device associated with the spray gun. The parameter data may include the drive current parameter information, for example, and additionally, spray gun type identification information. The memory device is preferably integral with the spray gun or a cable connector that connects to the spray gun. The data or information can be in the form of analog or digital information. After reading the spray gun power supply parameter data, the spray gun controller appropriately operates and monitors the spray gun to ensure that the spray gun power supply is performing properly.

37 Claims, 6 Drawing Sheets

U.S. PATENT DOCUMENTS

| | | |
|---|---|---|
| 5,788,728 A | 8/1998 | Solis et al. |
| 5,816,508 A | 10/1998 | Hollstein et al. |
| 5,843,515 A | 12/1998 | Crum et al. |
| 5,847,945 A | 12/1998 | Burtin et al. |
| 5,904,294 A | 5/1999 | Knobbe et al. |
| 5,908,162 A | 6/1999 | Klein et al. |
| 5,938,126 A | 8/1999 | Rehman et al. |
| 5,972,417 A * | 10/1999 | Perkins et al. .............. 239/690 |

* cited by examiner

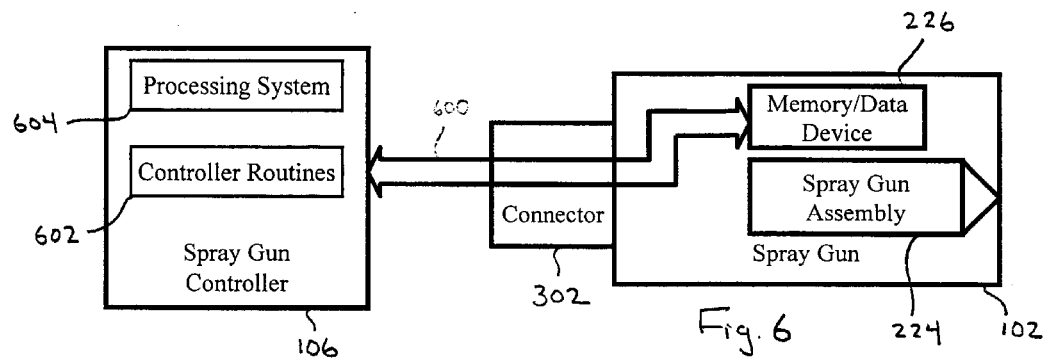
Fig. 6
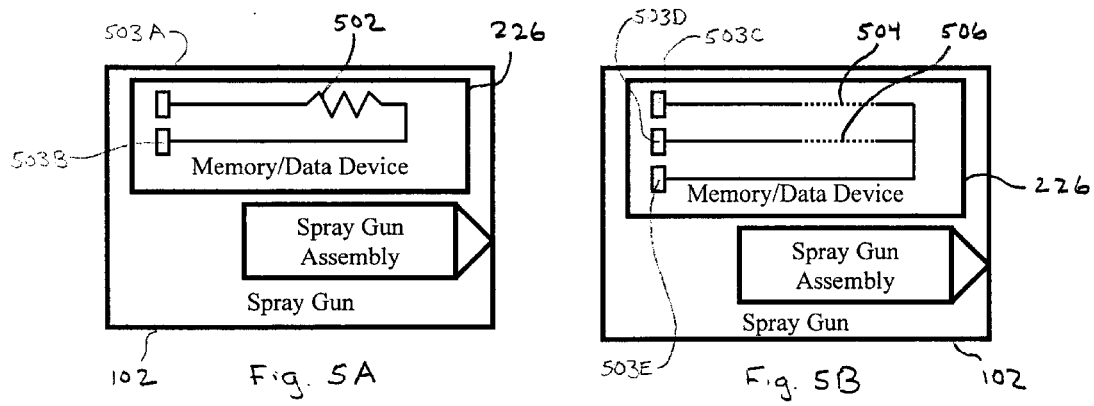
Fig. 5A
Fig. 5B
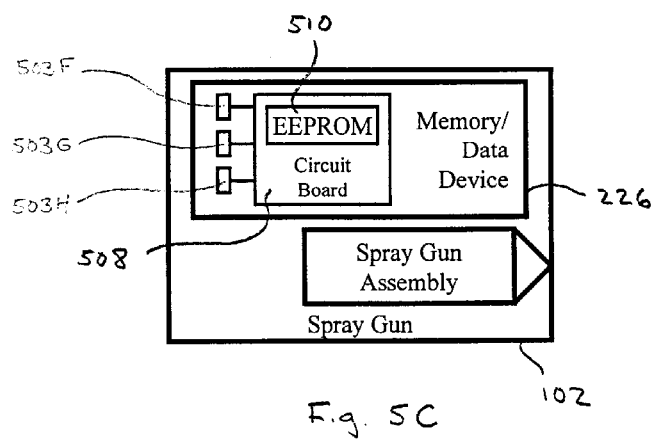
Fig. 5C

SPRAY GUN WITH DATA DEVICE AND METHOD OF CONTROL

This application claims the benefit of provisional application Ser. No. 60/154,560 filed Sep. 17, 1999.

FIELD OF THE INVENTION

The invention relates generally to electrostatic spray systems, and more particularly, to methods and devices for controlling electrostatic spray guns having memory devices associates therewith that store the spray gun's operating parameters and identification information.

BACKGROUND OF THE INVENTION

Electrostatic spray systems apply powder paints and coatings to a variety of products including, for example, appliances, automotive components, metal office furniture/storage shelving, electrical transformers, and recreational equipment. A critical component of such spray systems is a spray gun and a spray gun controller, and more particularly, the power supply for the spray gun and the control of that power supply by the controller. The spray gun and the spray gun controller are responsible for generating a corona-charging effect that is the basis of electrostatic spray systems.

In corona-charging systems, the power supply charges the gun electrode to a high voltage which produces an electric field between the spray gun and a part to be painted. Powder is sprayed through the area of the electric field. Passing through this area, the powder particles are charged and are drawn to the usually grounded part to be painted. In this manner, the part to be painted is coated with powder paint.

In prior art systems, controllers are set up to control a "standardized" power supply. This means that a set of standard drive voltages and drive currents are used to drive the power supply associated with each spray gun, and, likewise, standard feedback current information from the power supply is used to monitor and control each of the power supplies. In fact, however, there is a great deal of variance between power supplies. Power supplies are built from capacitors and diodes and other components which are potted. There's often a variation between these components, and in the potting material as well. Consequently, there is often variation in the drive voltage and drive current which is necessary to produce a given electrostatic effect from one spray gun to another spray gun of the same model. Up to now, however, controllers have been incapable of distinguishing between power supplies since no information has been provided which can be used to identify individual performance parameters with each power supply.

SUMMARY OF THE INVENTION

In accordance with the present invention, optimization of this powder painting process can be achieved by providing a system and method by which a spray gun controller can identify the type of spray gun it is controlling and monitor and optimize parameters associated with the operation of the particular power supply for each spray gun.

According to one embodiment of the present invention, a method of controlling an electrostatic spray gun power supply is provided. The method includes, for example, the steps of: storing the parameter data associated with a particular spray gun power supply in a memory device associated with the spray gun and using that data to monitor and control the gun's power supply. The parameter data preferably includes the maximum drive voltage, drive current, and feedback current of the spray gun. The memory device may be, for example, integral with the spray gun or a cable connector that connects to the spray gun. Typically,the power supply is molded into the body of the spray gun. Optimally, a semiconductor chip that carries parameter information for the power supply would be molded into the power supply or the housing for the gun. This information would then be read by the controller though the electric cable that connects the controller to the spray gun.

According to another embodiment of the present invention, a method of determining and storing spray gun power supply information is also provided. The method includes, for example, the steps of: placing a spray gun in a test system to generate parameter information relating to the spray gun power supply, and storing that information in a memory device associated with the spray gun. The memory device may be, for example, integral with the spray gun or a cable connector that connects to the spray gun.

According to yet another embodiment of the present invention, a method of identifying a spray gun type or model is provided. The method includes, for example, the steps of: reading spray gun identification information from an identification device associated with the spray gun and determining the type of spray gun based on the read spray gun identification information. The information to be read can be in the form of analog or digital information. The analog information can be, for example, a voltage, current, or resistance value. The digital information can be, for example, binary. Each value, whether analog or digital, identifies a particular type of spray gun or model.

According to yet another embodiment of the present invention, a system for controlling a spray gun is provided. The system preferably includes one or more spray guns for spraying material onto objects, a data device associated with each spray gun, and a spray gun controller for reading the data device associated with each spray gun and controlling the spray gun based thereon. The data device can be one of several embodiments including, for example, a resistor, a bit pattern as represented by a combination of open or short-circuited connections, or a circuit board having a memory thereon. The data stored in the data device may include, for example, spray gun type identification information and/or operating parameter information for the power supply of the spray gun.

According to yet another embodiment of the present invention, a spray gun assembly is provided. The spray gun assembly includes, for example, a spray dispensing subassembly and a data device having information associated with the spray gun assembly. The data device can be one of several embodiments including, for example, a resistor, a bit pattern as represented by a combination of open or short-circuited connections, or a circuit board having a memory thereon. The data stored in the data device includes at least spray gun type identification information and/or operating parameter information for the power supply of the spray gun.

According to yet another embodiment of the present invention, a spray gun cable is provided. The cable includes, for example, a plurality of electrical conductors, arid a connector portion for connecting to a spray gun. The connector portion includes a data device having spray gun data stored therein. The data device can be one of several embodiments including, for example, a resistor, a bit pattern as represented by a combination of open or short-circuited connections, or a circuit board having a memory thereon.

The data stored in the data device includes at least spray gun type identification information and/or operating parameter information for the power supply of the spray gun.

It is therefore an advantage of the present invention to provide a system and method for automatically identifying various types of electrostatic spray guns.

It is a further advantage of this invention to provide a system and method for utilizing the operating parameters associated with the individual power supply of each spray gun to more optimally operate an electrostatic spray gun coating system.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIGS. 5A, 5B, and 5C illustrate various embodiments of a memory or data device that is integral to a spray gun.

FIG. 6 is functional block diagram illustrating the relationships between a spray gun controller, spray gun, and memory device.

DETAILED DESCRIPTION OF ILLUSTRATED EMBODIMENT

Figure 1:
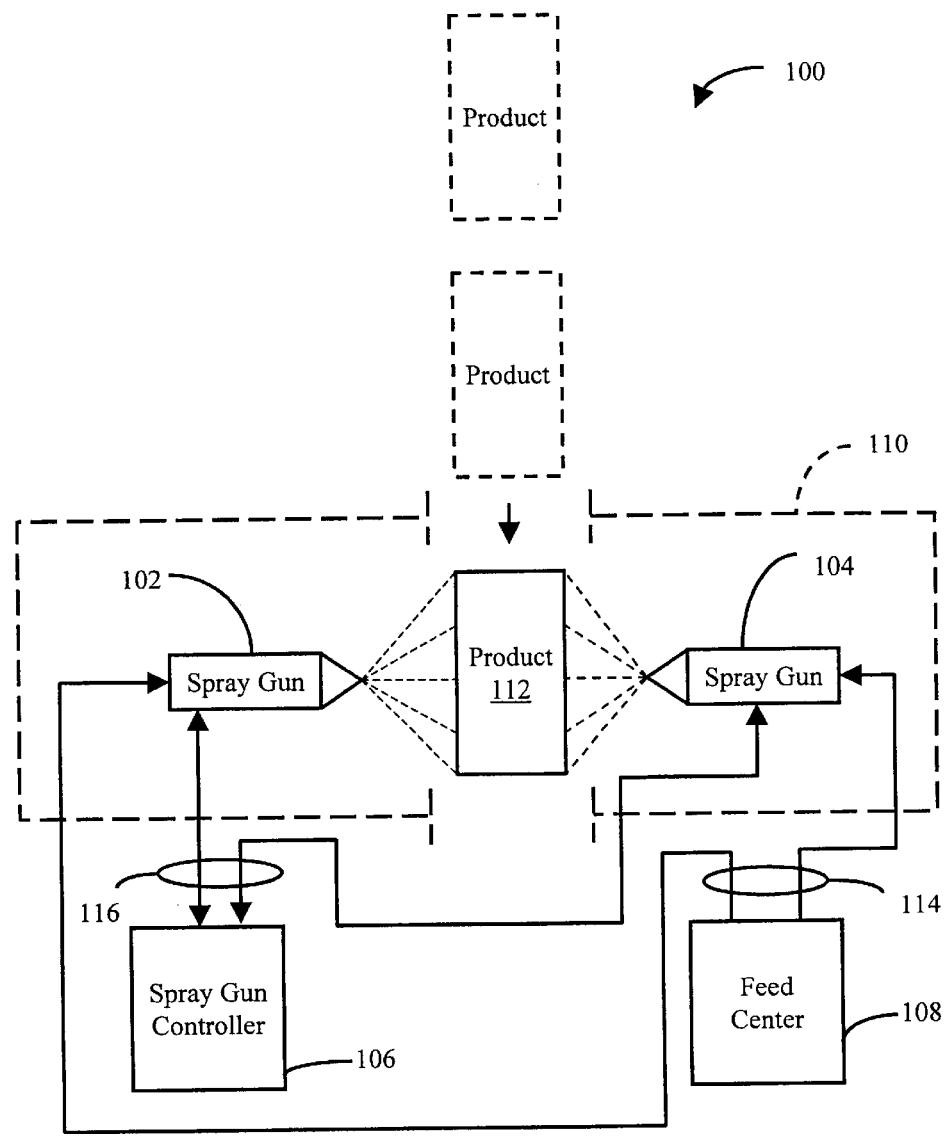
FIG. 1 is a functional block diagram of an electrostatic spray system of the present invention.

Referring now to FIG. 1, an overview of an electrostatic spray system 100 will now be discussed. The electrostatic spray system 100 generally includes, for example, one or more spray guns 102 and 104 that are in electric circuit communication with a spray gun controller 106. Typically, each gun is associated with its own dedicated controller 106. The circuit communication is preferably via shielded and insulated wire conductors. The one or more spray guns 102 and 104 are also in fluid communication with a powder coating material feed center 108. The fluid communication is via one or more hoses. Product or parts 112 to be sprayed or coated enter the electrostatic spray system 100 through an opening in a booth 110. In booth 110, the product 112 is sprayed by spray guns 102 and/or 104. The spray guns 102 and/or 104 are controlled by spray gun controller 106. Other components (not shown) such as, for example, a compressed air source and electric power source, are typically also part of electrostatic spray system 100. More detailed examples of electrostatic spray systems are described in U.S. Pat. No. 5,788,728 to Solis, U.S. Pat. No. 5,743,958 to Shutic, U.S. Pat. No. 5,725,670 to Wilson et al., U.S. Pat. No. 5,725,161 to Hartle, which are hereby incorporated by reference.

The electrostatic application of powder coating to the product 112 begins with fluidization. Fluidization is a process where powder being sprayed is mixed with compressed air, enabling it to be pumped from a container in the feed center 108 and supplied to the spray guns 102 and/or 104. The powder flow is regulated by controlling the air supplied to pumps associated with feed center 108. The powder supplied to the spray guns 102 and/or 104 is charged using either a corona or tribo-charging gun. Charged powder is sprayed towards the grounded product 112 by spray guns 102 and 104. When the powder particles come close to the product 112, an electrostatic attraction between the charged powder particles and the grounded product 112 adheres the powder to the product 112. The coated product 112 then passes through an oven (not shown) wherein the powder coating material is melted and cured. Any oversprayed powder is contained within the booth 110 and drawn into filter cartridges by a centrifugal fan (not shown). The recovered powder is then sieved and supplied back to the spray guns 102 and/or 104.

The spray gun 102 performs several functions including, for example: directing the flow of powder; controlling the spray pattern size and shape; and imparting the electrostatic charge to the powder being sprayed. It should also be noted that electrostatic spray system 100 is shown with two spray guns 102 and 104 for exemplary purposes only. Alternative embodiments of electrostatic spray system 100 can include one or more spray guns. Hence, reference hereinafter will be made only to spray gun 102 with the understanding that such reference applies to any number of spray guns that may be present in the electrostatic spray system 100.

The spray gun 102 is preferably one or two types: corona charging or tribo-charging. High voltage or low voltage cables 116 are the two preferred ways that the power is supplied to a corona-charged powder spray gun. If the high-voltage generator is internal to the gun, a low-voltage cable feeds the power supply in the gun. If the high-voltage power supply is external to the gun, a high-voltage cable extends from the power supply to the gun. Both types of guns can be negative or positive in polarity. Generally, corona charging uses a negative polarity high-voltage power supply because negative polarity produces more ions and is less prone to arcing than positive polarity. The charging electrode is held at a very high negative potential, requiring a power supply rated from about 30,000 to 100,000 volts.

The word tribo is derived from the Greek word tribune, meaning to rub or produce friction. In tribo charging, the powder particles are charged by causing them to rub at a high velocity on a tribo-charging surface and thereby, transferring charge from the charging surface to the powder particles. Without a strong electrostatic field in front of the spray gun extending from the corona electrode to the part, tribo-charging virtually eliminates the well-known problem of "faraday cage effect." In tribo guns, the powder particles generally take on a positive charge inside the spray gun due to the loss of electrons. The charged particles are then directed by the spray gun towards the part being coated. Because the particles are charged in the tribo spray gun and there is no strong electrostatic field, the powder particles do not build up on leading edges of the product 112 to be coated. The advantage tribo guns is the elimination of "fatty edges," resulting in a uniform coating and even film build on the product 112.

The powder spray gun 102 can also be either manual or automatic. Manual spray guns are held and triggered by a hand painter. Examples of manual spray gun systems include SURE COAT® Manual Spray Gun System, TRIBOMATIC® II. Spray Gun, TRIBOMATIC® 500 Manual Spray Gun, TRIBOMATIC® Wand, and the TRIBOMATIC® Disc, all manufactured by Nordson Corp. of Westlake, Ohio. Automatic spray guns are triggered by a controller. Automatic guns may be fixed, or supported on gun movers. Examples of automatic spray gun systems include the VERSA-SPRAY® II Automatic Spray System and the VERSA-SPRAY® II PE Porcelain Enamel Spray System with SURE COAT® Control, all manufactured by Nordson Corp. of Westlake, Ohio. Examples of various spray guns suitable to the present invention are described in U.S. Pat. No. 5,938,126 to Rehman et al., U.S. Pat. No. 5,908,162 to Klein et al., U.S. Pat. No. 5,904,294 to Knobbe et al., U.S. Pat. No. 5,816,508 to Hollstein et al., U.S. Pat. No. 5,725,161 to Hartle, which are hereby incorporated by reference. In addition to the above-cited examples, the present invention in general is applicable to any type of spray gun utilizing corona or tribo-charging. In particular, however, the invention is directed to corona-type guns having integral power supplies.

Figure 2:
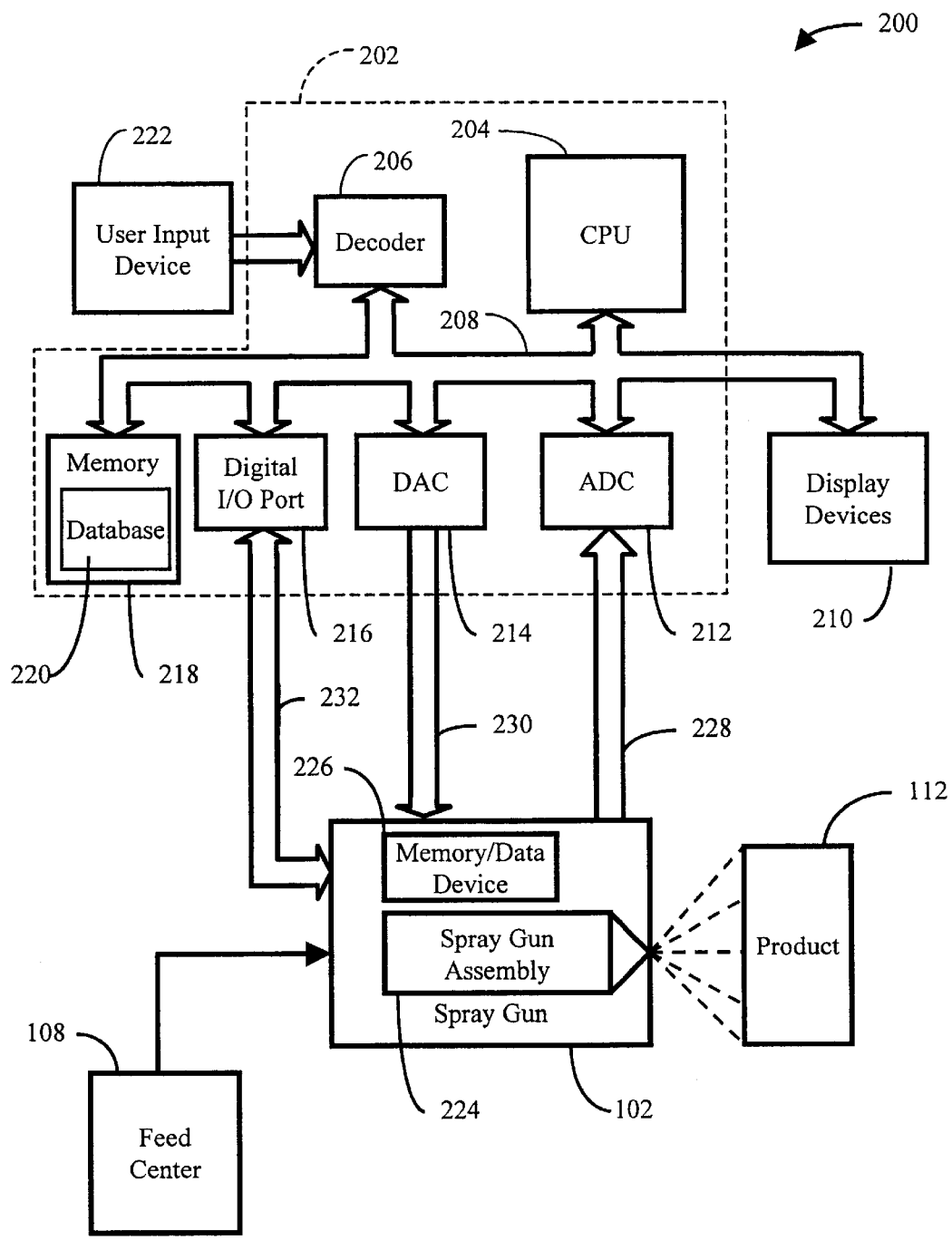
FIG. 2 is a functional block diagram of a system for testing a spray gun and for determining the spray gun's power supply operating parameters.

Referring now to FIG. 2, an exemplary system 200 for testing a spray gun 102 and for determining the spray gun power supply operating parameters is shown. Once the operational parameters of spray gun 102 are determined, system 200 stores these parameters and gun type identification data in a memory device associated with the spray gun 102. The system 200 has a testing controller 202, associated user input device 222, and display device 210. The user input device 222 is preferably used to input alpha-numerical information through a keyboard or similar keypad and/or other information that can be provided by a mouse or other pointing device(s). The display device 210 preferably displays information generated from the system 200 and preferably includes CRT or LCD displays.

The testing controller 202 preferably includes a programmable CPU 204, a decoder 206, analog-to-digital converter (ADC) 212, digital-to-analog converter (DAC) 214, digital I/O port 216, and memory 218, all of which are in circuit communication with each other through data bus 208. The testing controller 202 may further include additional components such as, for example, external memory devices including disk drives and CD ROM, network interfaces, and device expansion ports (not shown).

The internal components described above of testing controller 202 will now be discussed. The decoder 206 decodes information input from the user input devices (e.g., keyboard or mouse) and places such information on data bus 208. The ADC 212 converts analog information received from spray gun 102 on analog data bus 228 to digital information and makes such digital information available on data bus 208. The analog information read from the spray gun 102 includes the gun's power supply operating parameters such as, for example, minimum drive current, maximum drive current, and feedback current information. The minimum drive current parameter would represent the lowest level of current, for a given drive voltage, which is required for the power supply to be operation under no-load conditions. The maximum drive current parameter would represent the level of current required, for a given drive voltage, which is required to operate in the power supply under a specified fully loaded condition. These two parameters would define the drive current operating window for the power supply at the given drive voltage. Therefore, during normal operation, the controller would compare these parameters to the actual drive current. If the drive current falls outside of these windows, it would indicate to the controller that the power supply should be replaced. For example, if the power supply is operating with a drive current of less than the minimum required voltage to operate the power supply under no-load conditions, then there must something wrong with the power supply.

Moreover, one power supply may have a minimum drive current of 50 mA, whereas another power supply as tested has minimum drive current of 74 mA. This means the first power supply is more efficient in that it only requires 50 mA to power-up the power supply under no-load conditions, whereas the second power supply requires 75 mA to power-up that power supply under no-load conditions. This also means that a reading of 60 mA for the second power supply indicates a problem—since at least 75 mA are required for operation, but would not be indicative of a problem relative to the more efficient first power supply that requires only 50 mA to be operational. Thus, according to the present invention, in that the controller can access the individual parameters associated with each individual power supply, the system can more accurately determine from monitoring power supply drive current, for example, whether there is a problem with a particular power supply for an electrostatic spray gun. Without such capability, control systems in the past have had to prescribe a very wide window of acceptance for a power supply parameter such as, for example, drive current. These prior control methods has allowed some electrostatic spray guns to continue to be used after their power supplies have degraded or become inoperable such that the powder coating material is no longer being effectively charged.

In some circumstances, ADC 212 and analog data bus 228 may be in circuit communication with gun 102 through appropriate buffering and interface devices (not shown). The function of such buffering and interface devices would be to scale the analog information to levels which are appropriate for input into ADC 212.

The DAC 214 converts digital information from testing controller 202 to analog information suitable for input to the spray gun 102 through analog data bus 230. In some cases, DAC 214 and analog data bus 230 may be in circuit communication with spray gun 102 indirectly via appropriate buffering components (not shown). The information transmitted along analog data bus 230 includes drive current and/or drive voltage information which is input to the spray gun 102. Through analog data buses 228 and 230, the testing controller 202 is capable of directing testing information such as, for example, drive current and/or drive voltage and simultaneously monitoring the feedback current levels present in the spray gun 102 during operation.

A digital I/O port 216 is in circuit communication with the spray gun 102 through digital data bus 232. So configured, purely digital information can be passed between the testing controller 202 and the spray gun 102. As will be described in more detail, such digital information includes at least a spray gun type identifier.

Still referring to FIG. 2, the spray gun 102 of the present invention has a spray gun assembly 224 and a memory device 226 associated therewith. In the embodiment of FIG. 2, the memory device 226 is integral with the spray gun 102 and includes information preferably relating to the spray gun type identification and spray gun power supply operating parameters. The spray gun assembly 224 preferably includes conventional spray gun components such as a power supply, electrode, grip handle or support mechanism, and fluid pathways for the flow of air entrained powder paint particles. Other components may also be present. So configured, the system 200 with the present invention utilizes analog and digital information to determine the operating parameters of the spray gun 102. These operating parameters, along with the spray gun type identification, can then be stored in the memory device 226 and in database 220.

Figure 3:
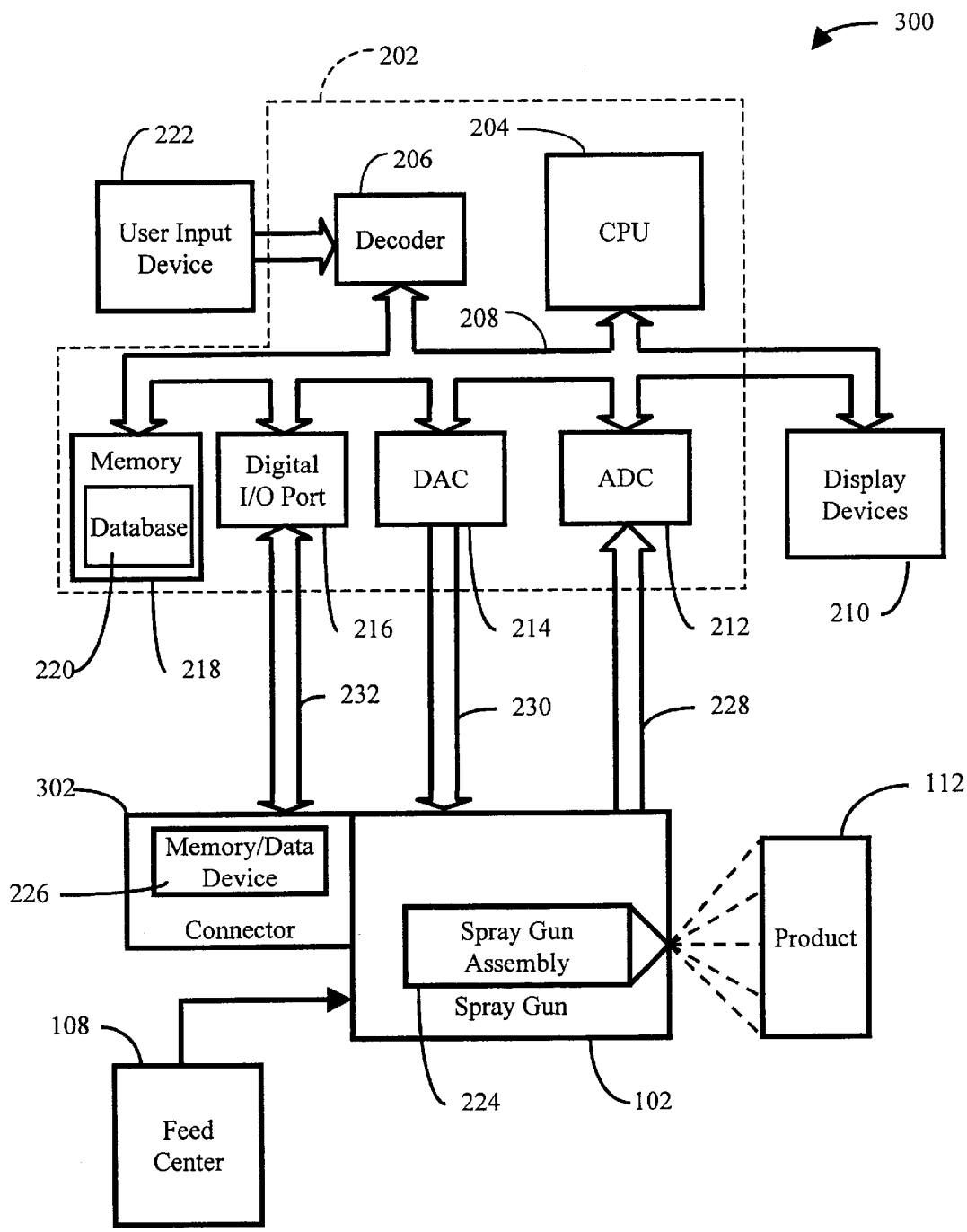
FIG. 3 is a functional block diagram of a system for determining a spray gun's power supply operating parameters and for storing such operating parameters and spray gun type identification information in a memory or data device.

Referring now to FIG. 3, a system 300 for determining the operating parameters of the spray gun 102 and for storing the operating parameters and the spray gun type identification in memory device 226 is illustrated. FIG. 3 is substantially similar to FIG. 2 and, therefore, a discussion of the similar components will not be presented and reference should be made to the previous discussion relating to FIG. 2 for such description. It should be noted that the spray gun 102 of FIG. 3 includes a connector 302 that has memory device 226 integral therewith. As will be described in more detail the connector 226 is preferably made of a molded electrically-insulating material and interfaces the spray gun 102 with the spray gun controller 106. Therefore, the spray gun configurations of FIGS. 2 and 3 provide alternative embodiments wherein the memory device 226 is integral with the spray gun 102 as shown in FIG. 2 or integral with a removable connector 302 that connects to the spray gun 102 as shown in FIG. 3. Memory devices may also be physically remote from the spray gun so long as they are logically connected with the spray gun power supply and the stored information is related thereto.

Figures 4, 9:
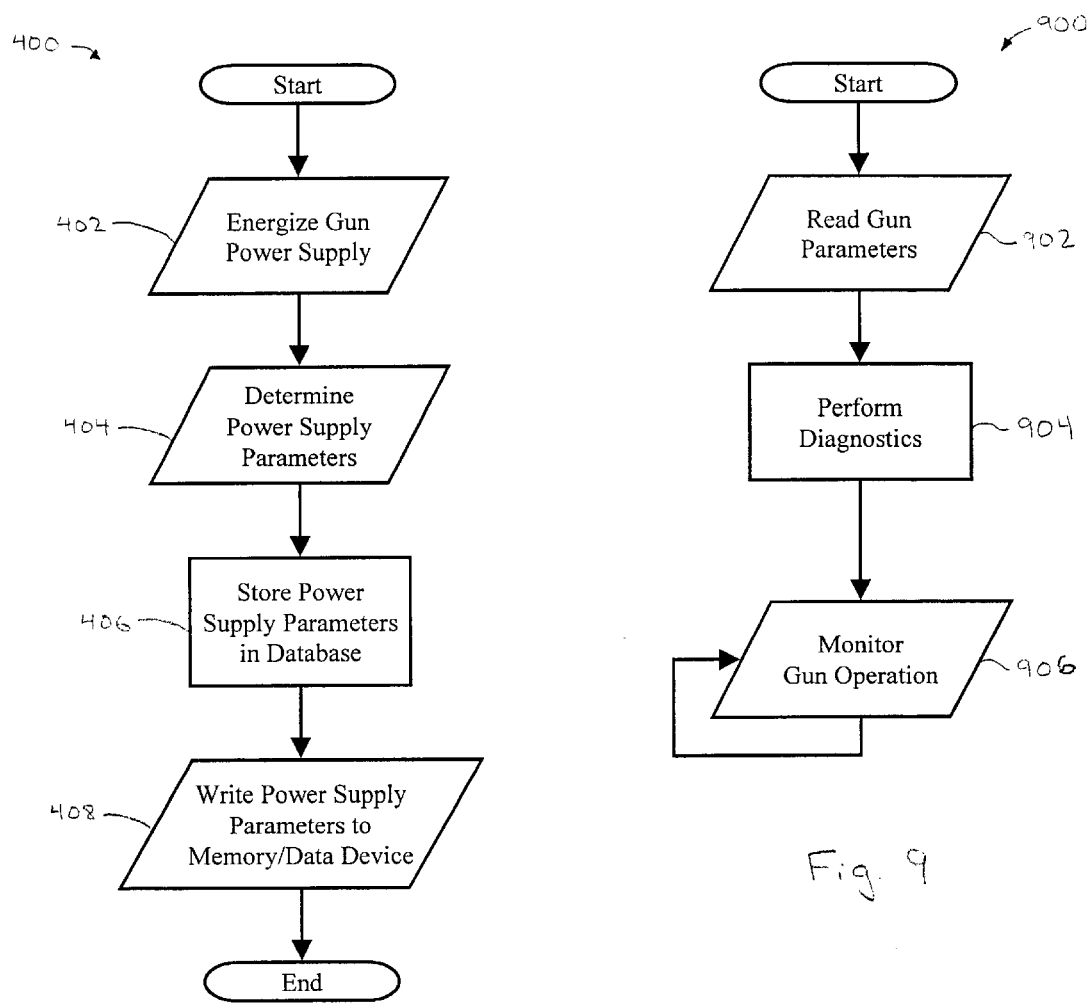
FIG. 4 is a flow chart illustrating the testing logic of the present invention for determining a spray gun's power supply operating parameters and the storage thereof, along with spray gun type identification information, in a memory or data device.
FIG. 9 is a flow chart of the logic for reading, configuring, and controlling a spray gun's power supply.

Illustrated in FIG. 4 is a flow chart showing the testing logic employed by systems 200 and 300 to determine a spray gun's power supply operating parameters of and the storage thereof, along with the spray gun type identification, in memory device 226. The logic starts at step 402 where the system energizes the power supply for the spray gun 102. As described above, this is accomplished by, for example, inputting a series of drive currents into the power supply at a given drive voltage to determine the minimum drive current necessary to operate the power supply at no-load conditions. The power supply is then loaded down to a fully-loaded condition and the drive current is measured and recorded to determine the maximum drive current necessary to operate the power supply under the fully-loaded condition at the given drive voltage. In step 404, these parameters are determined. These values are then stored in database 220 within memory 218, in step 406. In step 408, the logic writes the maximum drive voltage and current, feedback current, and gun type identification data, to memory device 226. The gun type identification data can be entered into the memory device 226 previous to the initiation of testing. The memory device 226 now includes important spray gun power supply operating parameter information and spray gun type identification information that can be subsequently read by a spray gun, controller from the memory device 226.

Referring now to FIGS. 5A, 5B and 5C, various embodiments of memory device 226 configured integral with spray gun 102 are shown. More specifically, the memory device 226 embodiments of FIGS. 5A and 5B are directed to spray gun identification information. The memory device 226 embodiment of FIG. 5C is directed to spray gun identification information and gun power supply operating parameter information. In each of the embodiments shown, the memory device 226 is in electric circuit communication with a connector port (not shown) that is integral to the spray gun 102. The connector port is preferably male (i.e., pins) or female (i.e., sockets) in configuration and adapted to be connectable to a mating cable and connector from the spray gun controller 106 or testing system 200.

Referring now specifically to FIG. 5A, the memory device 225 includes a molded resistor 502. The molded resistor 502 is disposed across two pins or sockets 503A and 503B of the spray gun. 102 connector port. The spray gun identification information is represented by the value of the molded resistor 502. With such a configuration, the spray gun controller 102 reads the resistor value, or alternatively, a voltage generated by forcing a current through the resistor 502. Based on the resistor or voltage value, the spray gun controller 106 can use a look-up table contained within the spray gun controller logic or controller routines to determine the type of spray gun and the operating parameters that are relevant to that spray gun type. For example, a resistor value of infinity (i.e., open-circuit) preferably indicates the absence of any type of spray gun. A resistor value of 1 k$\Omega$ can represent a first spray gun type. A resistor value of 10 k$\Omega$ can represent a second spray gun type. A resistor value of 100 k$\Omega$ can represent a third spray gun type. It should be understood from the above-description that a large, if not infinite, number of resistor and identifier combinations are available.

Referring now specifically to FIG. 5B, this embodiment of memory device 225 includes molded serial identification bits 504 and 506. The molded bits are disposed across at least three pins or sockets 503C, 503D, and 503E of the spray gun 102 connector port. The spray gun identification information is represented by the value of the molded bits. In the case of two bits, four possible spray gun identifiers are possible:

| Bit 1 | Bit 2 | Identification |
| --- | --- | --- |
| 0 | 0 | No Gun Present |
| 0 | 1 | Gun Type 1 |
| 1 | 0 | Gun Type 2 |
| 1 | 1 | Gun Type 3 |

A "1" bit is preferably represented by shorting a first or second pin or socket 503C, 503D with a third ground pin or socket 503E. A "0" bit is preferably represented by the first or second pin 503C, 503D being open-circuit with respect to pin or socket 503E. With such a configuration, the spray gun controller 102 reads the bit pattern of each identification pin or socket of the spray gun 102 connector port. Based on the bit value, the spray gun controller 106 can use a look-up table contained within the spray gun controller logic or controller routines to determine the type of spray gun and the operating parameters that are relevant to it.

Referring now specifically to FIG. 5C, this embodiment of memory device 225 includes a circuit board 508 preferably having an Electronically Erasable Programmable Read Only Memory (EEPROM) 510. The EEPROM 510 preferably includes at least spray gun identification information and operating parameter information. The spray gun identification information may take the form of two or more bits (as earlier described) or an identification code. The code may be in any form including binary, hexadecimal, alphabetic, numerical, and alpha-numeric. Any type of code or coding system capable of being stored within EEPROM 510 can be employed. The operating parameter information preferably includes the spray gun's minimum drive current at no-load conditions and the drive current required to operate the power supply at a specified fully loaded condition, both at a specified given drive voltage. These parameters are only exemplary and various other parameters could also be determined for the power supply and stored in the power supply's memory device 226. For example, one or more feedback current parameters, factory test date information, and other tracking information may be included. In alternative embodiments, memory device 226 can be an electronically programmable read-only memory (EPROM), programmable read-only memory (PROM) or a conventional read-only memory (ROM). So configured, the spray gun controller 102 reads the spray gun identification information and operating parameter information from the memory, device 226. Based on such information, the spray gun controller 106 can use a look-up table contained within the spray gun controller logic to determine the type of spray gun Referring now to FIG. 6, a block diagram illustrating the relationships between, for example, the spray gun controller 106, spray gun 102, and memory device 226 is shown. More specifically, the spray gun controller 106 includes a processing system 604 that it includes, for example, one or more microprocessors, I/O components (i.e., ADCs, DACs, displays, keyboard/keypad etc.), and memory devices. Additionally, spray gun controller 106 includes controller routines 602 for reading information from the memory device 226 and controlling the operation of the spray gun power supply based on the information provided from memory device 226. Additionally, controller routines 602 monitor spray gun 102 power supply parameters such as drive current, for example, to ensure that the power supply is operating properly.

Illustrated in FIGS. 7A–7E are various embodiments of memory device 226 configured external to spray gun 102. More specifically, FIGS. 7A–7E illustrates embodiments of the memory device 226 integral to a connector 302 for connecting a controller cable 702 from the spray gun controller 106 to the spray gun 102. The connector 302 preferably includes either a male (i.e., pins) or female (i.e., sockets) physical configuration that mates with a port integral or otherwise associated with the spray gun 102.

Figure 7A:
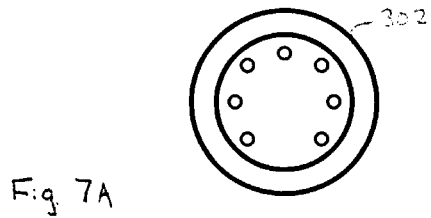
FIGS. 7A–7E illustrate various embodiments of a memory or data device that is external to a spray gun.
Figure 7B:
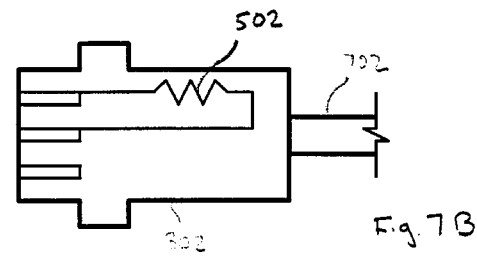
Figure 7C:
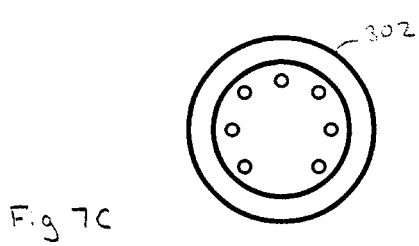

Illustrated in FIG. 7B is an embodiment of the memory device 226 having the resistor 502 molded integral to the connector 302. So configured, molded resistor 502 is employed in the same manner as described in connection with FIG. 5A. Namely, the spray gun controller 102 reads the resistor value or, alternative, a voltage generated by forcing a current through the resistor 502. Based on the resistor or voltage value, the spray gun controller 106 can use a look-up table contained within the spray gun controller logic or controller routines to determine the type of spray gun and its relevant operating parameters.

Figure 7D:
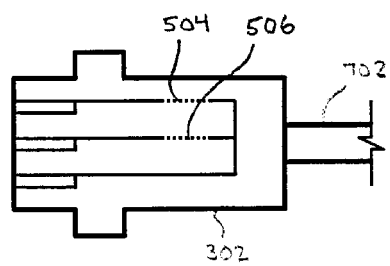
Figure 7E:
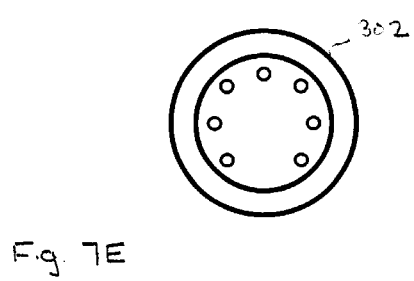

Illustrated in FIG. 7D is an embodiment of the memory device 226 having the molded serial identification bits 504 and 506 integral to the connector 302. So configured, the serial identification bits 504 and 506 are configured and employed in the same manner as described in connection with FIG. 5B. Namely, the spray gun controller 102 reads the bit pattern of each identification pin or socket of the spray gun 102 connector port. Based on the bit value, the spray gun controller 106 can use a look-up table contained within the spray gun controller logic or controller routines to determine the type of spray gun and its relevant operating parameters.

Figure 7F:
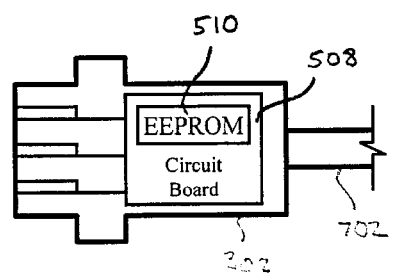

Illustrated in FIG. 7F is an embodiment of the memory device 226 having the circuit board 508 and EEPROM 510 integral to the connector 302. As described in connection with FIG. 5C, the EEPROM 510 preferably includes at least spray gun identification information and operating parameter information, which can be present in any of the several described forms (e.g., binary, hexadecimal, alphabetic, numerical, and alpha-numeric.) Moreover, as described above, the circuit board 508 may alternatively include EPROMs, PROMs and/or conventional ROMs.

Figure 8:
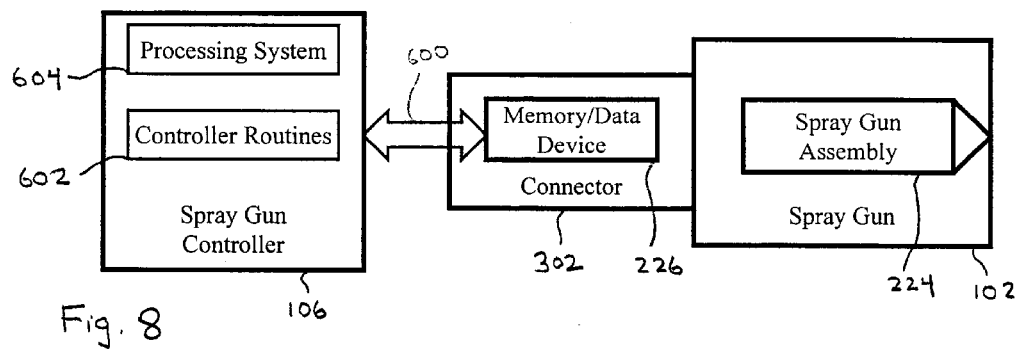
FIG. 8 is a functional block diagram illustrating the relationship between a spray gun controller, a spray gun, a connector to the spray gun from the controller, and a memory or data device.

Referring now to FIG. 8, a block diagram similar to FIG. 6 illustrating the relationships between, for example the spray gun controller 106, spray gun 102, connector 302 and memory device 226 is shown. By having memory device 226 located in a connector 302, the present invention is applicable to existing spray guns that are not adaptable to integral memory devices such as those described by FIGS. 5A–5C. However, this difference is invisible to the spray gun controller 106 because the controller does not know whether the spray gun identification information and/or power supply parameter information is coming directly from the spray gun 102 or a connector 302 associated therewith.

Referring now to FIGS. 6, 8, and 9, a discussion of a spray gun controller logic 900 for reading, configuring, and controlling a spray gun will be presented. The logic 900 starts in step 902 where the spray gun controller 106 reads the spray gun identification and/or operating parameter information from memory device 226. As described above, the memory device 226 can be, for example, integral to the spray gun 102 (i.e., FIG. 6) or integral to a connector 302 associated with the spray gun 102 (i.e., FIG. 8). Once the information is read, the logic 900 utilizes one or more diagnostic routines (in step 904) that use the operating parameter information to monitor (in step 906) the operation of the gun power supply. If a warning or alarm condition is detected indicating an existing or imminent power supply failure, that condition is preferably represented on a spray gun controller display.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the precise location of the memory device 220 may be modified. Additionally, information beyond the operating parameters and spray gun type identification can be included such as, for example, test facility, test operator, date of gun manufacture, maintenance intervals, etc. Also, whereas the invention has been described with respect to electrostatic powder coating material spray guns, it is equally applicable to electrostatic liquid coating material spray guns. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A coating system comprising:
  (a) a spray gun;
  (b) a memory device storing information specifically relating to the spray gun; and
  (c) a controller which reads information from said memory device and utilizes said information to control said spray gun.

2. The coating system of claim 1 wherein the memory device is contained within the spray gun housing.

3. The coating system of claim 1 wherein the memory device includes information on the type of spray gun.

4. The coating system of claim 1 wherein the gun is an electrostatic spray gun having a power supply and wherein said memory device includes operating parameter information relating to said power supply.

5. The coating system of claim 4 wherein said power supply and said memory device are located within said gun housing.

6. The coating system of claim 4 wherein said controller includes a comparator which compares said operating parameter information to operation information determined by the controller during the operation of the spray gun.

7. The coating system of claim 6 wherein said controller includes an output device and wherein said controller selectively operates said output device in response to comparisons between said operating parameter information and said operation information.

8. The system of claim 1 wherein said memory device is integral with a cable that is connectable to said spray gun.

9. The system of claim 1 wherein said memory device is integral with a connector that connects a cable to said spray gun.

10. The system of claim 1 wherein said memory device stores analog information.

11. The system of claim 10 wherein said memory device comprises an impedance having a value that identifies the spray gun.

12. The system of claim 11 wherein said impedance is a resistance.

13. The system of claim 1 wherein said memory device digitally stores information.

14. The system of claim 13 wherein said memory device comprises a non-volatile memory device.

15. The system of claim 1 wherein said memory device stores digital information.

16. The system of claim 15 wherein said memory device comprises one or more switches that identify the spray gun.

17. The system of claim 1 wherein said memory device is disposed within a housing of the spray gun.

18. The system of claim 1 wherein said memory device is supported on a housing of the spray gun.

19. The method of claim 5 wherein step (b) comprises the step of storing the parameter data relating to the identification of the spray gun type in the memory device.

20. The system of claim 1 wherein said memory device is disposed remote from said spray gun but logically associated therewith.

21. An electrostatic coating spray gun assembly comprising a spray gun housing, a power supply located within said housing and a memory device located within said housing, said memory device storing information relating to the model designation of said power supply.

22. The gun assembly of claim 21 wherein said memory device includes information relating to operating parameters of said power supply.

23. A system for controlling a spray gun comprising:
 (a) one or more spray guns for spraying material onto objects;
 (b) a data memory device associated with each spray gun, each data memory device having information stored therein relating to the particular spray gun it is associated with; and
 (c) a spray gun controller for reading the data memory device associated with each spray gun and controlling each of the spray guns based on the information in the associated gun's data memory device.

24. The system of claim 23 wherein the data memory device comprises a resistor.

25. The system of claim 23 wherein the data memory device comprises short-circuitable jumper bits.

26. The system of claim 23 wherein the data memory device comprises a data memory device selected from the group consisting of: electronically erasable programmable read-only memories (EEPROM), electronically programmable read-only memories (EPROM), and read-only memories (ROM).

27. The system of claim 23 wherein the data memory device is built into a connector of a spray gun cable.

28. The system of claim 27 wherein the data memory device is contained within the housing of the spray gun.

29. A method for controlling a spray gun, comprising the steps of:
 (a) providing a spray gun with spray gun related information stored in a memory device integral with the spray gun; and
 (b) providing a gun controller which reads the information from the memory device.

30. The method of claim 29 wherein the gun related information includes parameter information relating to the power supply for the gun.

31. The method of claim 30 further comprising the step of operating the gun and collecting gun operation information.

32. The method of claim 31 further comprising the step of comparing the gun operation information to the parameter information.

33. The method of claim 32 further comprising the step of selectively operating a display in response to the comparison step.

34. A method of storing parameter data associated with a spray gun, the method of comprising the steps of:
 (a) reading parameter data associated with a particular spray gun from said particular spray gun; and
 (b) storing the parameter data in a memory device integral with the spray gun.

35. The method of claim 34 wherein step (a) comprises the step of reading parameter data relating to the drive current for the power supply for the spray gun.

36. The method of claim 34 wherein step (a) comprises the step of reading parameter data relating to identification of the spray gun type.

37. The method of claim 35 wherein step (b) comprises the step of storing the parameter data relating to the power supply drive current in the memory device.

* * * * *